INVENTOR.
FEDELE TERENZANI
BY John Toggenburger
AGENT

INVENTOR.
FEDELE TERENZANI
BY John Taggenburger
AGENT

INVENTOR.
FEDELE TERENZANI
BY John Toggenburger
AGENT

INVENTOR.
FEDELE TERENZANI
BY John Toppenburger
AGENT

United States Patent Office 3,417,849
Patented Dec. 24, 1968

3,417,849
BACKSPACING DEVICE FOR A PROPORTIONALLY SPACING TYPEWRITER

Fedele Terenzani, Ivrea, Italy, assignor to Ing. C. Olivetti & C., S.p.A., Ivrea, Italy, a corporation of Italy

Continuation-in-part of application Ser. No. 420,923, Dec. 24, 1964. This application Dec. 19, 1966, Ser. No. 602,741
Claims priority, application Italy, Jan. 4, 1964, 472/64
9 Claims. (Cl. 197—91)

ABSTRACT OF THE DISCLOSURE

A rotary memory disk which is in mutual motion transmitting communication with a proportional letter-feeding carriage and which has settable memory elements thereon which under control of successive typing operations produce a running record of a series of proportional space typing positions of said carriage, and a backspacing device utilizing said record to impart appropriate-extent rotary motions to said disk to recall one by one said typing positions in an order of succession reverse to which said record was made. Mechanism providing that after each backspacing, each tabulating, and each carriage returning operation, said memory disk is in condition to receive a new running record.

The inventive coverage herein embraced is a continuation-in-part of my earlier application Ser. No. 420,923 filed Dec. 24, 1964, now abandoned, such prior application having been filed with a claim to convention priority of a patent application filed in Italy on Jan. 4, 1964.

The invention relates to backspacing devices for proportional letter-feeding typewriters and more particularly provides for backspacing operations of appropriate incremental value through automatic reference control to a memory device which in the course of proportional space typing operations precedingly effected has produced a proportional space record.

Heretofore, if an operator by backspacing operation wanted to recall a passed typing position or positions, she either had to know the incremental values by which the carriage had to be backspaced, or had to make a visual judgment of the incremental backspacing requirement and then had to operate a single-increment backspacing key the adjudged number of times or had to operate selectively one of a number of different increment backspacing keys. At best the necessary procedures were cumbersome and obviously subject to confusion and erroneous results.

The backspacing device of the present invention involves a memory device which incidental to the individual typing operations produces a record of the exact proportional space positions at which typing impressions are made. Whenever the typist decides to recall a previous typing position to type one or a series of correcting characters, she merely is required to operate the novel backspacing device once for each erroneous character that has become spaced beyond the printing point, and such operations will backspace the carriage in an order of succession reverse to that which the record was made by said memory device and each time by an appropriate multiple of a basic feed increment of which proportional spaces are multiples. Moreover, after each backspacing operation, the memory element, by reference to which the backspace size was automatically regulated is automatically restored so that the proportional space memory is made current to receive modified settings by corrective typing operations.

In a patent to C. Delvigne No. 928,591, dated July 20, 1909, there are settable memory elements or pins provided on a memory member according to uniform size letter spaces, and such memory pins are capable of being set to afford a record of carriage positions whereat a word space bar has been operated, whereby locations of word spaces between letter spaces of uniform value are memorized. Not only is the Delvigne device incapable of memorizing any typing position, but of the word space positions memorizable thereby, only the last one is recallable through backspacing action. Also, the record of word spaces remains unaltered after a backspacing operation, and is only cancellable through carriage advance travel after each set memory pin has travelled in advance direction for nearly one turn of the memory wheel. There are many other peculiarities in the Delvigne patent which render the disclosure therein totally inadequate, structurally and functionally to accomplish what is done by the subject invention.

Many other advantages and adjunct features of the invention will become apparent from a detailed description of a preferred embodiment of the invention which follows.

The invention is incorporated in a proportional spacing typewriter substantially of the type described in the United States Patent to Beccio No. 2,945,578 dated July 19, 1960.

Figures 5, 5A, 6:
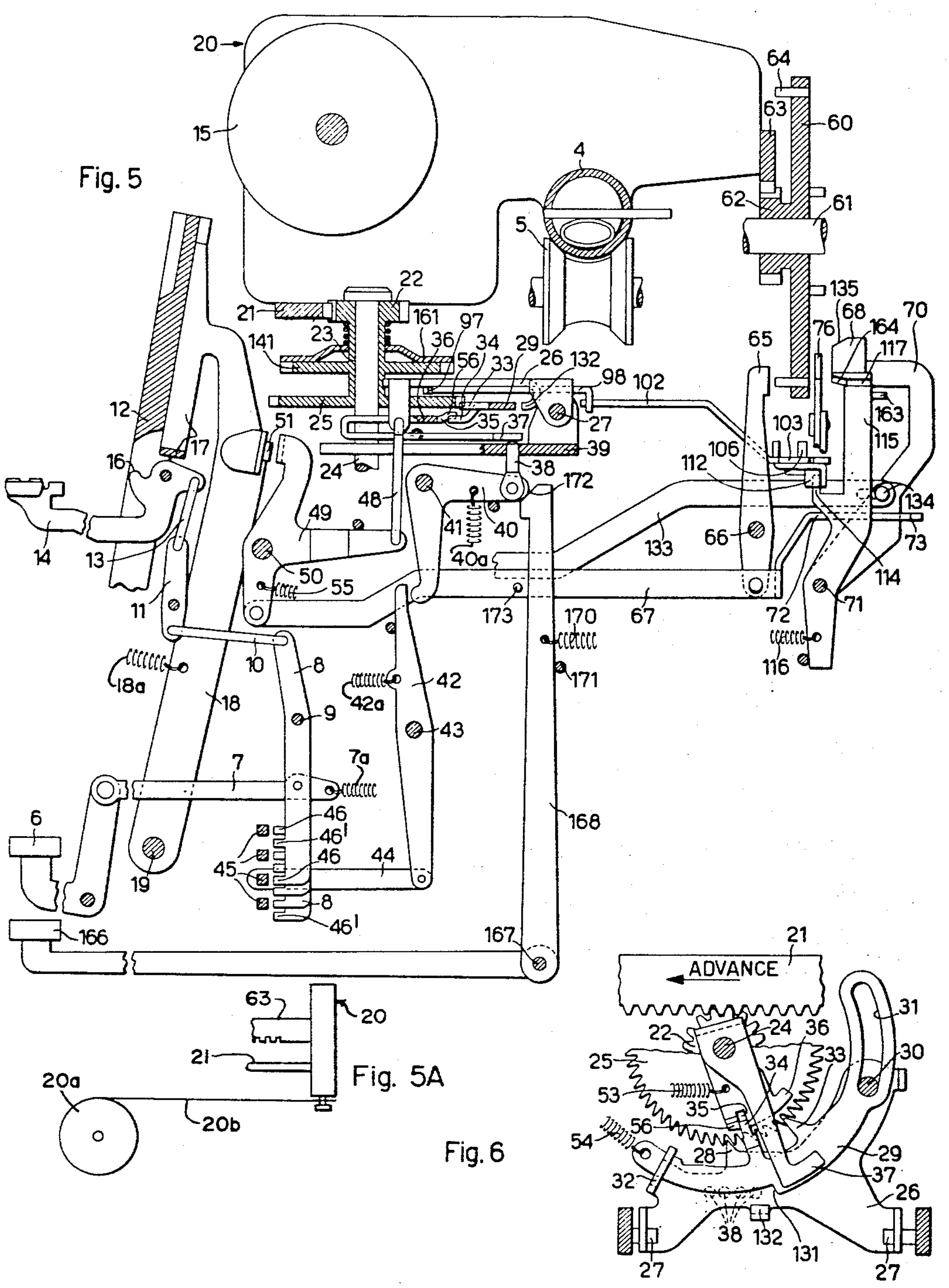
FIG. 5 is a right-hand sectional side elevation of a proportional spacing typewriter incorporating the invention.
FIG. 5A is a diagrammatic view of the carriage.
FIG. 6 is a sectional bottom view of a proportional spacing mechanism with the rear facing the viewer.

Referring to FIG. 5, it will be seen that upon depression of any character key 6 an individually related link 7 moves leftwardly against the tension of a return spring **7*a*. This rocks a lever 8 pivoted at 9, thereby moving a wire link 10 rightwardly. Through a lever 11, pivotally mounted on a usual type bar segment 12, a second wire link 13 is moved downwardly, thus throwing the associated type bar 14 against a usual platen roller 15. During the last few degrees of such throw a nose 16 on the type bar strikes against a usual universal bar 17 to operate it rearwardly against the tension of a spring 18$^{a}$. Said universal bar is carried by arms 18 pivotally mounted on a rod 19, the latter having support on the type bar segment 12** and being capable of case shifting therewith.

Figure 3:
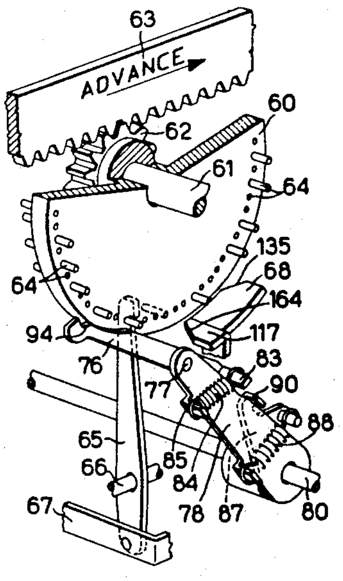
FIG. 3 is a rear perspective view of the mechanism seen in FIG. 1.
Figure 2:
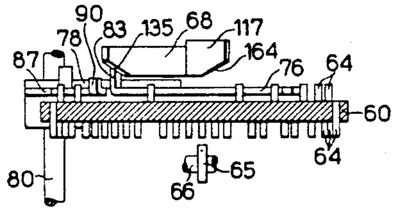
FIG. 2 is a sectional view taken along line 2—2 of FIG. 1.

As shown in FIGS. 3 and 5, the platen roller 15 is supported on a carriage 20 which by a spring motor 20$^{a}$ through a draw band $20^b$ is under constant urge to advance in letter-feed direction. The carriage includes a tubular member 4 by which it is guided to travel upon grooved rollers 5. Parallel to the member 4 there is provided a rack 21 with which a pinion 22 meshes which is integral with a hub 23 and therewith is rotatable on a stationary shaft 24. Unitary with said pinion 22, at the lower end of said hub, there is an escapement wheel 25 having teeth spaced at unit increments of which proportional letter spaces consist variously in accordance with the widths of the characters being type.

Normally the escapement wheel 25 is held against advance rotation by an escapement dog 33 which is part of a slide 29 movably mounted by a stud 30 on an escapement rocker 26. The latter is pivotally mounted on pins 27, and resides normally in an upwardly rocked position wherein a holding dog 28 for the escapement wheel 25 stands clear thereabove. Said curved slide 29 embodies a curved slot 31 by which it is capable of spring urged sliding movement on said rocker contra to the letter-feed direction if disengagement of its dog 33 from the escapement wheel is effected by operation of the rocker 26. At an end remote to said slot 31 said slide 29 has guidance parallel to the plane of the rocker 26 in a slot of an ear 32 of the rocker 26.

Reaching toward the escapement wheel shaft 24, said slide 29 has a projection 34 normally residing in a slot 35 of sector 36 which is rotatably mounted on said shaft 24. Said sector 36 has a bent-over arm 37 by which it is adapted to be arrested by any selected one of six selectably settable proportional space regulating stop-pins 38, the latter being arranged in a curve concentrically about said shaft 24, see FIG. 6.

Each one of the stop-pins 38 is adapted to slide upwardly in a perforation provided in a stationary plate 39, and is pivotally supported by a lever 40, all of such levers being journalled on a stationary rod 41 and standing normally returned by a spring $40^a$. Each lever 40 is operable by a lever 42 pivoted at 43 and is connected to an arm 44 of a bail 45. The bails 45 and the levers 42 are biased to return by springs $42^a$ associated with the latter. There are as many bails 45 as there are stop-pins 38 and each bail 45 is engageable by projections 46 of particular ones of said levers 8. Said bails 45 are case shiftable downwardly along with said segment 12 so that projections 46' become substituted for the projections 46 opposite appropriate bails 45, and thus to provide for appropriate selections of pins 38 suited to the various widths of upper case characters.

As shown in FIG. 5, the rocker 26 is connected through a wire link 48 to a lever 49 which is pivotally mounted at 50 and is engageable by a member 51 that is unitary with the universal bar 17.

It will now be seen that upon depression of any character key 6, the associated lever 8 is rocked clockwise, whereby the related type bar 14 is operated and concomitantly the lever 8 operates an appropriate bail 45 through one of said projections 46 or 46' to effect through the levers 42 and 40 the operation of the required feed increment controlling pin 38.

As the nose 16 of the type lever 14 strikes against the universal bar 17, the rocker 26 is operated against the urge of a spring 55. The escapement dog 33 carried on the rocker 26 will thus be disengaged from the wheel 25 and the dog 28 integral with the rocker will hold temporarily the escapement wheel against rotation.

Immediately the arm 37 moves counter to the letter-feed direction of the escapement wheel 25 under the urge of a spring 53 having connection with the sector 36. Somewhat less lively the movable dog 33 with its integral slide 29 moves also counter to the letter-feed direction under the urge of the relatively weaker spring 54. Thus the projection 34 on the slide 29 will quickly assume an underlying relation with respect to the sector 36, and so long as this condition prevails the rocker 26 cannot restore even if the universal bar 17 restores to its normal position due to the return of the type bar. As the arm 37 contacts the stop-pin 38 the sector 36 becomes arrested. An instant later the projection 34 of the dog 33 arrives over the slot 35 and strikes a bent-over lug 56 so that it may then enter such slot, whereby the rocker 26 is then enabled to restore upwardly under the urge of its related spring 55. It is at such time that the movable dog 33 reengages the escapement wheel 25 and the rocker dog 28 moves clear of it. Under the urge of the usual carriage draw-spring the wheel 25 advances now to the extent the movable dog 33 is then slidable on the rocker 26 to assume its normal position. Thus proportional character spacings of the carriage by the required multiple increments are effected in response to operation of the various type keys 6.

Referring now specifically to FIGS. 1 to 5, inclusive, a device for memorizing a series of succeedingly effected proportional spaces, as to size and succession, preferably comprises a memory disk 60 which is rotatably mounted on a stationary pivot 61 and has a pinion 62 constantly in mesh with a rack 63 carried on the carriage 20. Linear motion of the carriage will thus be translated into equivalent larger-scale rotary motion of the disk 60. Said memory disk 60 constitutes a member associated with the carriage so that either will effect movement of the other. The disk 60 is provided with a series of settable elements in the form of pins 64 which are evenly distributed in a concentric array thereon and are so spaced that for each single, basic increment advance of the carriage a successive pin 64 will arrive opposite a setting station whereat a setting member in the form of a lever 65 is provided. Said lever 65 is fulcrumed on a stationary pivot 66. In their unset positions the said pins 64 extend forwardly from the disk. Referring to FIG. 5, incidental to each typing operation the setting lever 65 is rocked clockwise by the operation of the universal bar operated lever 49 which acts through the medium of a link 67. The universal bar 17 restores to normal position before the carriage has a chance to execute its proportional space advance. Consequently also the setting lever 65 always restores before the carriage moves, and the set pin 64 is then free to advance with the disk a number of said basic proportional increments as called for by the operation of the proportional space escapement. At each succeeding typing operation the setting lever 65 will again become momentarily operated so that each time the newly set pin on the disk 60 advances with the latter equivalent to the feed increment that is associated with the particular characters that have been typed.

Figures 7, 8, 9:
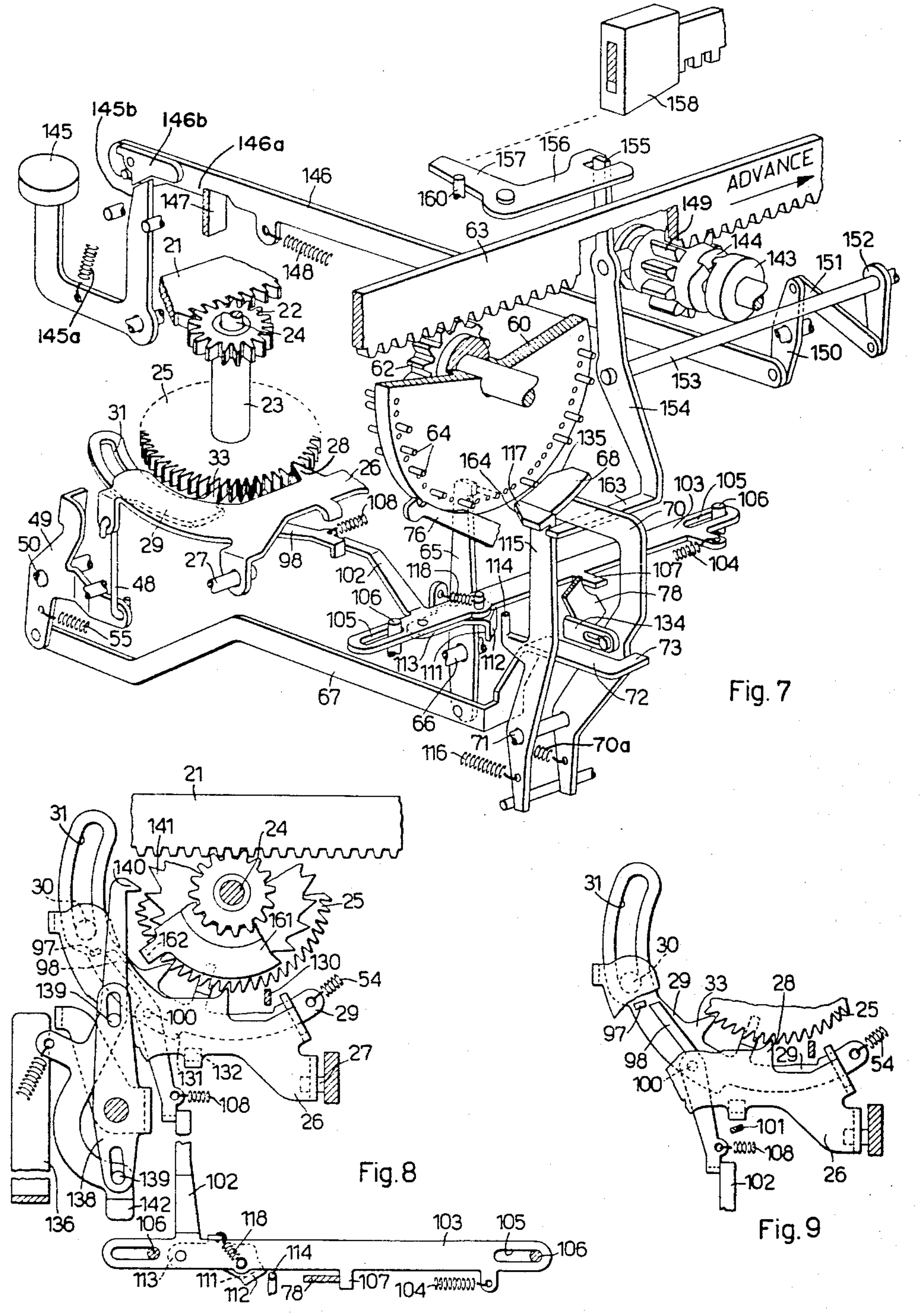
FIG. 7 is a left-hand rear perspective view showing an interassociation of parts of the backspacing mechanism with a proportional spacing device, as well as with a power carriage return mechanism.
FIG. 8 is a plan view of the proportional spacing mechanism seen in FIG. 6 along with adjacent mechanisms, the rear thereof facing the viewer.
FIG. 9 is a plan view similar to FIG. 8, but more fragmentary.

The memory disk 60 is preferably so small as to contain a much lesser number of memory pins 64 than there are possible incremental positions of the carriage. In order that the set memory pins advancing from the setting station constitute always a new record of a series of last-effected proportional spacings, there is provided at the rear of the memory disk 60 a curved pin-restoring element 68 which is borne on a lever 70 having pivotal support on a rod 71 and which is operable against the tension of a spring $70^a$ by a rearward extension 72 of the ling 67 through a laterally extending lug 73. Said curved pin-restoring element 68 is dimensioned to restore at least as many pins 64 to the left of the one being set by the setting member 65 as the number of feed increments which the largest possible proportional letter space contains, namely six. It is to be understood that the restoring element 68 always re-assumes its normal position before the carriage escapes. The reason for this is that while the escapement rocker 26 is operated, the dog 28 will hold the escapement wheel 25 against advance. Obviously, as the rocker 26 restores, the train of parts 48, 49, 67 restores, so that only then the pin restoring element reassumes its normal position under the tension of the spring $70^a$ (FIG. 7). Obviously this is before the carriage can execute a letter feed step. The transitory operation of the pin-restoring element 68 incident to each typing operation assures that no set pin 64 advances to and beyond the setting station into the range of operation of a backspacing pawl 76 where the proportional space record must be constituted through the most recently effected typing operations. It will thus be seen that during typing operations a running record of successive sizes of proportional spaces is produced.

Figure 1:
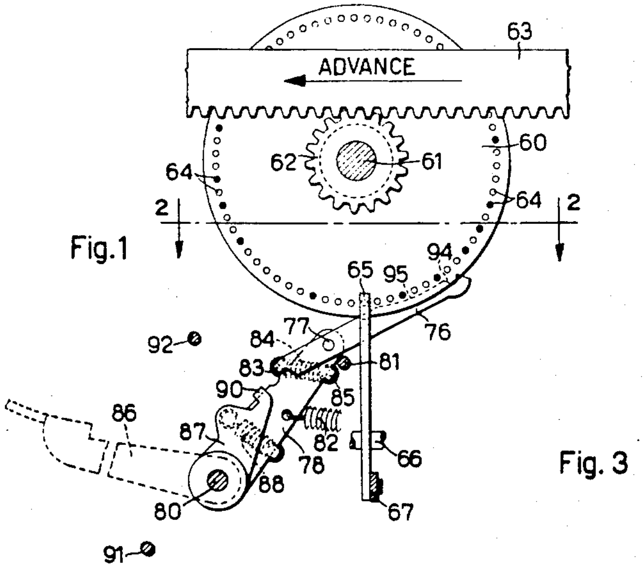
FIG. 1 is a sectional front view showing the backspacing mechanism of the invention.
Figure 4:
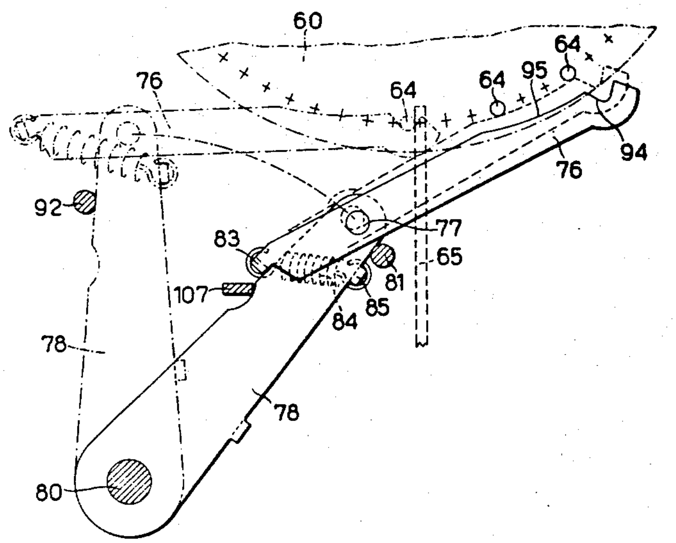
FIG. 4 is similar to FIG. 1 but on an enlarged scale and showing in dot-and-dash lines an operated condition of the mechanism.

Referring now more particularly to FIGS. 1, 3 and 4, the backspacing pawl 76 is disposed normally clear of the memory pins 64, and is pivotally carried at 77 on an arm 78 which has pivotal support on a shaft 80. As seen in FIG. 1, said arm 78 abuts normally a stop-pin 81 toward which it is urged by a strong restoring spring 82. The backspacing pawl 76 has a lug 83 which normally contacts an edge on the arm 78 under the urge of a spring 84 which extends between said lug 83 and a lug 85 on the arm 78.

As viewed in FIG. 1, the arm 78 is operable counterclockwise through depression of a backspacing key or lever 86 provided fast on said shaft 80 at a forward portion of the machine. Also fast on the shaft 80 is an arm 87 which through the medium of a strong spring 88 is capable to operate the arm 78, said arm 87 having a lug 90 which under the tension of said spring 88 normally contacts the arm 78.

The backspacing key or lever is operable against a limit-stop 91 shown in FIG. 1 and, in turn, the arm 78 is preferably operable against its own limit-stop 92 as shown in FIG. 1. The backspacing pawl 76 has near its right extremity a notch 94 by which it is adapted to engage set pins 64 to backspace the carriage. Leftwardly of said notch 94 said pawl 76 is provided with an upper edge 95 which in the normal position of the pawl conforms substantially to a circle slightly outside of the settable pins 64. The illustrated proportional spacing mechanism provides for a maximum incremental advance of six units, and if the last proportional space advance preceding a backspacing operation has been six units the operation of the backspacing pawl will by its notch engage and backspace the last set pin a little beyond the setting station, that is a little more than six increments, as shown in dot-and-dash lines in FIG. 4. During such operation six teeth on the escapement wheel will ratchet past the escapement dog 33. However, because proportional space advances range from one to six units, there may stand set more than one pin 64 in the six unit range to the right of the setting station. The edge 95 on the pawl 76 provides a guiding means whereby during the backspacing operation of the lever 86, the pawl will glide idly along the underside of the set pin or pins 64 until the right end of said edge 95 passes the set pin which is nearest to the setting station and thus allows the pawl to move upwardly to effect by said notch an engaged association with said nearest pin to back space it a little beyond the setting station. This means that always any backspacing operation of the pawl 76 will effect a single-sweep, complete backspacing movement of the disk 60 by engagement with the particular set pin which is closest to the setting station and it further means that the order of succession of the backspacing operation on the set pins 64 is in reverse to the order in which the proportional letter-feeds have been effected.

It has been stated that the escapement dog 33 ratchets over the teeth of the escapement wheel 25 during the time that the memory disk 60 is backspaced. In order that this be so, the slide 29 which embodies the dog 33 is provided with a protuberance 97 which in a space between such slide and the rocker 26 is up-reaching. Incidental to each backspacing operation, a lever 98 is automatically moved counterclockwise about a pivotal point 100 on said rocker to a position against a stop 101. An end of the lever 98 then cooperates with said protuberance 97 to constrain said slide 29 to have only capacity for pivotal movement about the location of the stud 30.

As illustrated in FIGS. 8 and 9, said lever 98 is under the constant urge of a spring 108 to move to effective position, but is normally held in its ineffective position through a finger 102 on a slide 103 which normally occupies the shown position under the tension of a spring 104. Said slide 103 has slots 105 whereby it is slidably mounted on stationary studs 106. At the very outset of each backspacing operation, the arm 78 of the backspacing mechanism starts to act on a nose 107 thereby to move said slide 103. In the initial movement of said slide 103 the finger 102 frees the lever 98 for movement by its spring 108 to its position of cooperation with the protuberance 97, thereby to constrain said slide 29 for pivotal movement. Such position of the lever 98 prevails until the backspacing mechanism becomes fully restored.

Certain proportional spacing mechanisms are known which inherently permit incremental backspacing movements and then readily hold the carriage against advance. One such proportional spacing mechanism is disclosed in the patent to Toggenburger, No. 2,865,488, dated Dec. 23, 1958. It is thus to be understood that the mechanism described in the two previous paragraphs merely adapts the shown particular proportional spacing mechanism for incremental backspacing use. No such mechanism is required if the backspacing device of the invention, for example, is applied to the machine of Toggenburger.

Incidental to each backspacing operation, the memory pin 64 by involvement of which the backspacing operation was effected, needs to be restored because if it were not, it would represent a non-existing proportional space position and there could be no desired proportional feed record for subsequent utilization. Restoration of each memory pin utilized by the backspacing mechanism is effected automatically after the escapement wheel 25 is again under the control of the escapement dog 33, and preferably after the pawl 76 is on its restoring stroke far enough from operated position for the curved upper edge 95 thereof to underlie the backspaced pin 64 at the setting station. At such time a cam face 111 on an ear 112 of a flipper arm 113 pivotally carried on the slide 103, acts on a pin formation 114 of a lever 115, to cam such lever about the rod 71 forwardly toward the rear of the memory wheel 60. A spring 116 is associated with the lever 115 to hold it normally in its rearward position in which a pin-restoring member or head 117 has a short front edge opposite the setting station, capable of restoring only the one pin 64 residing opposite such station. Such head 117 is situated high enough so that when it is operated it will clear the edge 95 of the backspacing pawl 76 then bearing against the underside of the pin 64 at the region of the setting station. Therefore, during the restoration of the backspacing mechanism, the said head 117 effectively restores the pin without interference by the restoring backspacing pawl 76. The stated flipper arm 113 is pivotally carried on the slide 103 which under the tension of a spring 118 is urged to its rearward position shown in FIGS. 7 and 8. During each actuating stroke of the backspacing pawl 76, the rear face of the ear 112 contacts the pin formation 114 and yields idly out of the way along with the flipper arm 113.

The before stated pin restoring head 117 is immediately adjacent to the pin restoring element 68 and the latter is also clear of the restoring path of the pawl 76, similarly to the head 117.

Figure 10:
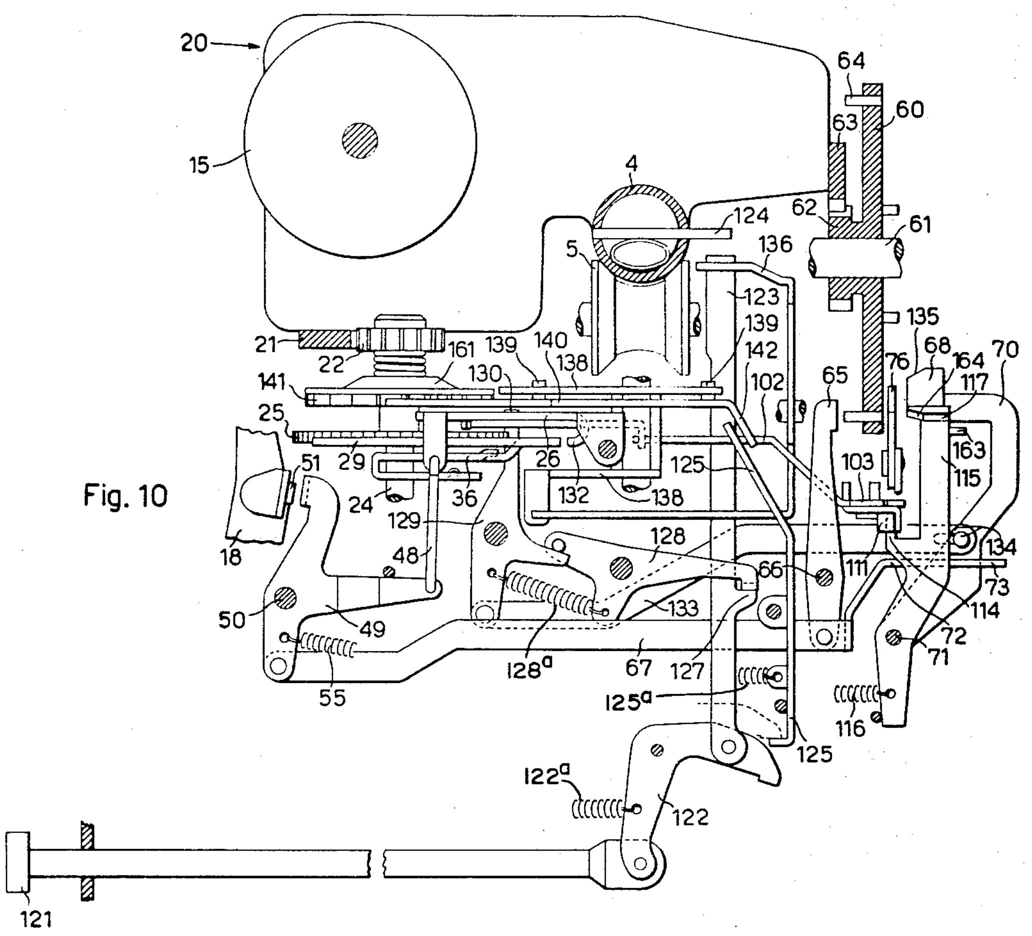
FIG. 10 is a right-hand sectional view similar to FIG. 5 and illustrating a tabulating mechanism in association with the invention.
Figure 11:
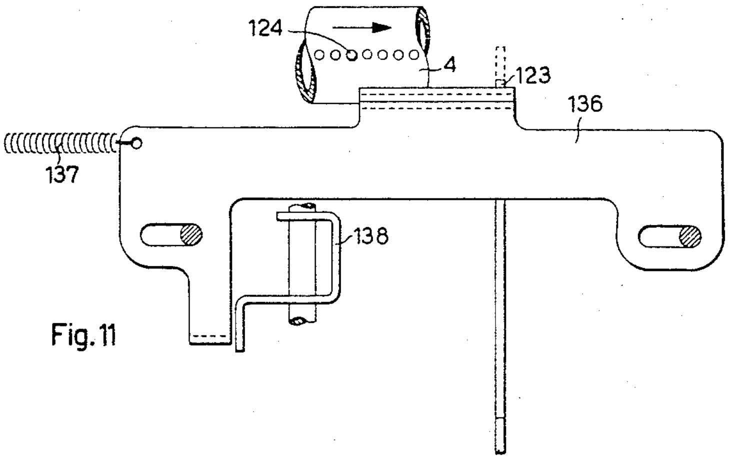
FIG. 11 is a rear view showing certain parts of the tabulating mechanism.

Referring now more particularly to FIGS. 6, 10 and 11, the machine is equipped with the tabulating mechanism shown in the stated Patent No. 2,945,578. Any set memory pin 64 which during tabulation advances toward the setting station in a range equivalent to the increments contained in the largest proportional space, is required to become restored, so that the pins will advance past the setting station in unset state and the setting member 65 is capable of producing the required current proportional space record. In FIG. 10, a tabulating key 121 is shown connected to a bell crank 122 and a restoring spring 122[a] is shown to hold normally said bell crank in the normal position. When the tabulating key 121 is operated it will act through the bell-crank 122 to raise a tabulator reed 123 into stopping range with set tabulator pins 124 on the tubular member 4. In such operation the crank 122 becomes detained by a pivoted latch element 125 which is biased by a spring 125$^a$ to the position seen in FIGURE 10. Furthermore, a shoulder 127 on the reed 123 acts on a lever 128 which in turn moves a lever 129 clockwise. A spring 128$^a$ connected between the levers 128 and 129 places a bias on both to restore them to their positions seen in FIGURE 10. The latter has an upper end 130, see FIG. 8, by which the sliding dog 33, 29 is operated out of engagement with the escapement wheel 25 and far enough for a shoulder 131 on said dog to engage a stop lug 132 on the rocker 26, thereby to restrict sliding movement of the dog 29. The carriage is thus freed for tabulating advance through its usual advance-urging spring. Concomitantly with such operation the lever 129 actuates a link 133 forwardly which by a pin-and-slot connection 134 will operate the lever 70 having the pin restoring member 68 thereon. Obviously, said pin-and-slot connection 134 permits operation of the lever 70 through the lug 73 incidental to typing operations. The pin restoring member 68 has a cam edge 135 so that while the memory wheel 60 is participating in the tabulating movement, any memory pin 64 residing in the range of said member or advancing thereinto will become automatically restored.

The tabulator reed 123 protrudes through a slidable plate 136, see FIG. 11, and when engaged by the advancing tabulator pin 124 it will operate said plate against the urge of a spring 137. In turn the plate 136 will operate a bail 138 to move a carriage arresting hook member 140 into stopping relation with a coarsely toothed wheel 141, the latter being unitary with the escapement wheel 25. Said hook member 140 has capacity for limited sliding movement on the bail 138 as at 139, and after the wheel 141 has imparted some sliding movement to the hook member the carriage becomes intercepted. While the stated sliding movement is imparted to the hook member 140, an ear 142 thereon releasingly rocks the latch element 125, whereby the tabulator key 121, the reed 123, the lever 129, the link 133 and the pin-restoring member 68 will restore. It will thus be evident that the appropriate pins 64 on the memory wheel 60 will become restored during the tabulating run of the carriage, so that the said wheel will be ready to receive appropriate new settings during subsequently effected typing operations.

A carriage return mechanism may be of a kind similar to that disclosed in the patent to H. L. Pitman, No. 2,258,715, dated Oct. 14, 1941. Such mechanism, see FIG. 7, includes a continuously motor driven clutch member 143 with which another clutch member 144 is engagable under control of a carriage return key 145 the latter normally occupying the position shown in said FIG. 7 under the tension of a spring 145$^a$. The other clutch member 144 has a pinion 149 integral therewith which is in constant mesh with the rack 63. The latter is thus not only associated with the memory wheel 60 but additionally serves in a carriage return driving capacity. Said carriage return key, when operated causes a rearward displacement of a control link 146 having a shoulder 146$^a$, normally engaging a stationary catch 147. Said link is under the constant rearward urge of a spring 148, but by said shoulder 146$^a$ being normally cooperative with catch 147 is normally held in the forward position seen in FIGURE 7. The stated rearward displacement of said control link 146 is effected by the spring 148 when the key 145, through a nose 145$^b$ thereon, cams a flipper element 146$^b$ on the link 146 upwardly and thus lifts the shoulder 146$^a$ on the link 146 clear above the catch 147. Said link consequently acts through parts 150, 151, 152 and shaft 153 to rock a shifter 154 for the clutch member 144 to engage the latter with the continuously motor-driven clutch member 143 for rotation thereby. The clutch shifter 154 has an upreaching extension 155 residing in a fork of a bell crank 156, the latter of which has a stop finger 157 for engagement by a carriage-carried margin stop 158. When said clutch shifter 154 closes the clutch the said stop finger 157 moves a short distance from a frame supported stop 160. When then the margin stop 158 in the course of the return run of the carriage encounters the finger 157 it will rock the bell crank 156 to normal position and thereby will open the clutch so that the carriage return movement is terminated. Furthermore, through restoration of said shifter 154 the control link 146 will become restored to its catch 147 and in doing so the element 146$^a$ will pivotally flip idly past the nose 145$^b$ of the carriage return key to finally arrive in the normal position shown. While the return movement of the carriage is in progress, the teeth of the escapement wheel 25 pass the dog freely because a usual friction drag disk 161, by a finger 162 thereon, cams the dog 33 free of the wheel, see FIGURE 8. Furthermore, as the dog 33 during carriage return movement is cammed clear of the wheel, it is intercepted after a short movement in return direction by movement of a shoulder 131 thereon against a stop lug 132 on the rocker. When the carriage return run is terminated, the carriage will advance only a short distance, because the finger 162 will allow the dog 33 to move into engagement with the wheel under the urge of the spring 54 quickly only after a small carriage movement.

The clutch shifter 154 has an arm 163 reaching downwardly and laterally to the rear of the lever 115 which bears the pin restoring head 117. Furthermore, said head has a cam-face 164, so that whenever a carriage return run is instituted and in progress, any pin 64 which may stand set and moves against said head 117 will become restored. At the end of the carriage return the disk 60 is thus again in condition to receive appropriate new pin settings representative of proportional space values.

The so far described backspacing device operates properly to recall a series of sequential typing positions if the last type key operation was not followed by a space key operation. However, an operator may follow the last type key operation with a space key operation before discovering an error, and thus if no provision were made also to set a memory pin 64 incidental to each space key operation, the last set character space representing pin 64 may be more than six increments advanced from the setting station and may thus be out of reach of the backspacing pawl 76. In view of this and also to facilitate the recall of typing positions ahead of any one of several separately intervening word spaces, the machine of the invention, see FIG. 5, provides also for the setting of a memory pin incidental to effecting each operation of a space key 166. The latter is part of a rockable structure which includes a pivoted shaft 167 and an upright arm 168. A spring 170 urges the structure clockwise against a limit stop 171. At its upper end the arm 168 has a cam edge 172 to act on one of the levers 40, such as the one which carries the three-increment stip pin 38. Whenever the space key 166 is operated, the arm 168 swings forwardly and by its cam edge 172 lifts the associated lever 40 to set the three-increment pin 38. Then the arm 168 engages a pin 173 on the link 67 to operate the memory pin setting lever 65 and the pin restoring lever 70. After the space key 166 is released, the setting lever 65, as well as the pin restoring lever 70 will restore, and the carriage will execute a three-increments advance. It will now be evident that by operation of the backspacing device there can be recalled a series of letter space positions and plain space positions in the reverse order in which they occurred during advance travel of the carriage. Also each time any of such position is recalled, the memory pin 64, through involvement of which the recall was made, becomes automatically restored, so that the memory automatically is rendered current with the then prevailing carriage position.

Obviously, the backspacing device and memory mechanism of the invention may be devised in various forms and coordinated to different kinds of proportional spacing mechanisms, all within the purposes and novel results which are evident from the preferred embodiment of the invention herein described.

It is to be particularly observed that if the backspacing capacity in the described machine is increased to nine or more increments, then the desirability for setting memory pins under space key control is virtually eliminated.

What is claimed is:

1. In a typewriter having a carriage for advance and return travel, operable type keys, a typing mechanism selectively responsive to said type keys to type different characters, means normally tending to advance the carriage, and a proportional letter-feed mechanism normally holding the carriage against advancement and including means to respond to individual operations of said type keys to facilitate after each character is typed a proportional step advancement of the carriage in terms of varying multiples of a basic feed increment, the combination therewith of an improvement for backspacing said carriage comprising, (a) a memory member for storing a record representative of successive proportional step movements of the carriage, (b) means associating said memory member with the carriage for movement of either one by the other, (c) a plurality of settable memory elements on said memory member so spaced that for each basic increment advance movement of the carriage the memory member will advance a related basic increment, (d) a setting member at a setting station opposite to which any of said settable memory elements may normally reside under the control of the proportional letter-feed mechanism in order to be settable individually by said setting member and thereby to produce a proportional space record of the positions at which characters are typed, (e) means to actuate transitorily said setting member incidental to each response of said typing mechanism to said keys and before the proportional letter-feed mechanism facilitates a proportional step advancement of the carriage, whereby through the settable memory elements set there is produced said proportional space record, (f) a backspacing key, (g) a backspacing means responsive to separate operations of said backspacing key once or repeatedly to effect each time under the control of any settable memory element which in a given range in backspacing direction happens to reside set and closest to the setting station, a backspacing movement of the memory member which will bring such set memory element to the setting station, thereby to recall the carriage position at which it was set, (h) and means effective in accompaniment with each operation of said backspacing means to unset the particular memory element under control of which in such operation it was brought to the setting station.

2. In a typewriter having a carriage for advance and return travel, operable type keys, a typing mechanism selectively responsive to said type keys to type different characters, means normally tending to advance the carriage, and a proportional letter-feed mechanism normally holding the carriage against advancement and including means to respond to individual operations of said type keys to facilitate after each character is typed a proportional step advancement of the carriage in terms of varying multiples of a basic feed increment, the combination therewith of an improvement for backspacing said carriage comprising, (a) a memory member for storing a record representative of successive proportional step movements of the carriage;

(b) means associating said memory member with the carriage for movement of either one by the other, (c) a plurality of settable memory elements on said memory member so spaced that for each basic increment advance movement of the carriage the memory member will advance a related basic increment, (d) a setting member at a setting station opposite to which any of said settable memory elements may normally reside under the control of the proportional letter-feed mechanism in order to be settable individually by said setting member and thereby to produce a proportional space record of the positions at which characters are typed, (e) means to actuate transitorily said setting member incidental to each response of said typing mechanism to said keys and before the proportional letter-feed mechanism facilitates a proportional step advancement of the carriage, whereby through the settable memory elements set, there is produced a proportional space record, (f) a backspacing key, (g) a backspacing means responsive to separate operations of said backspacing key once or repeatedly to effect each time under the control of any settable memory element which in a given range in backspacing direction happens to reside set and closest to the setting station, a single-sweep backspacing movement of the memory member which will bring such set memory element to the setting station, thereby to recall the carriage position at which it was set, (h) a restoring element at said setting station transitorily operable to restore any memory element located thereat, (i) and means to effect a transitory operation of said restoring element in accompaniment with each operation of said backspacing means each time after the latter has effected a backspacing movement of a set memory element to said setting station.

3. The invention set forth in claim 1, (i) a restoring member for the settable memory elements having an expanse to restore in a given range of advance approach of said settable elements toward said setting station any memory element which in such range may stand set due to previously effected operations of the type keys, (j) and means operated in accompaniment to each transitory actuation of said setting member to operate said restoring member, whereby during typing any memory element will arrive at said setting station in an unset condition.

4. The invention set forth in claim 3, (k) a cam face provided on the restoring member at the end which is remotest to said setting station, (l) a tabulating key, (m) a normally ineffectively conditioned tabulating mechanism, (n) means controllable by the operation of the tabulating key on one hand and controllable by the carriage running to a tabulating limit on the other hand, respectively to render said tabulating mechanism effective and ineffective, (o) and means to operate and restore said restoring mechanism respectively by said controllable means as the latter renders said tabulating mechanism effective and ineffective.

5. In a typewriter having a carriage for advance and return travel, operable type keys, a typing mechanism selectively responsive to said type keys to type different characters, means normally tending to advance the carriage, and a proportional letter-feed mechanism normally holding the carriage against advancement and including means to respond to individual operation of said type keys to facilitate after each character is typed a proportional step advancement of the carriage in terms of varying multiples of a basic feed increment, the combination therewith of a device to backspace the carriage successively in terms of appropriate multiples of said basic feed increment to recall seriatim a series of passed typing positions of the carriage in order reverse to that in which they occurred, comprising, (a) a rotatively mounted disk, (b) means interconnecting said disk with said carriage so that lineal movement of the carriage is always translated into rotary movement of the disk and vice versa, (c) a plurality of settable memory elements carried on said disk in a concentric array and spaced thereon in accord with single basic feed increments of the carriage transmittable thereto.

(d) an operable setting member at a setting station and opposite which any of said memory elements may normally reside under the control of the proportional letter-feed mechanism in order to be settable by said setting member to memorize the carriage position, (e) and an actuatable member having an operating stroke sufficient to backspace to said setting station in a single-sweep any memory element which stands advanced from said setting station within a range of a given number of feed increments corresponding to the largest size proportional space, said actuatable member having a notch formation by which it is adapted to engage any set memory element which stands advanced from the setting station within said range, said actuatable member having adjoining said notch formation in the backspacing direction of said disk a guiding face which by cooperation with set memory elements in said range acts controllingly on said actuatable member so that the latter by its notch formation at each of its actuations will coact only with that set memory element which at the time happens to reside closet to the setting station, thereby to backspace the carriage by such element.

6. In a typewriter having a carriage for advance and return travel, operable type keys, a typing mechanism selectively responsive to said keys to type different characters, means normally tending to advance the carriage, and a proportional letter-feed mechanism normally holding the carriage against advancement and including means to respond to the individual operations of said type keys to facilitate after each character is typed a proportional step advancement of the carriage in terms of varying multiples of a basic feed increment, the combination therewith of a device to backspace the carriage successively in terms of multiples of said basic feed increment to recall seriatim a series of passed typing positions of the carriage in an order reverse to that in which they occurred, comprising, (a) a rotatively mounted disk, (b) means interconnecting said disk with said carriage so that lineal movement of the carriage is always translated into rotary movement of the disk and vice versa, (c) a plurality of settable memory elements carried on said disk in a concentric array and spaced thereon in accord with single basic feed increments of the carriage transmittable thereto, (d) an operable setting member at a setting station and opposite which any of said memory elements may normally reside under the control of the proportional letter feed mechanism in order to be settable by said setting member to memorize the carriage position, (e) means to actuate and restore said setting member incidental to each response of said typing mechanism to said type keys and before the proportional letter-feed mechanism facilities a step advancement of the carriage, whereby each time a memory element is set at said setting station and then advances under the control of the proportional letter-feed mechanism, (f) a backspacing member having an operating stroke sufficient to backspace to said setting station any memory element which has been set at and has advanced from said setting station a distance corresponding to the largest proportional space, (g) guiding means to govern the path of operation of the backspacing member by the set memory element or elements which have advanced beyond the setting station to cause said backspacing member to be effective at each of several successive operations thereof each time on the particular set memory element which then happens to stand advanced the shortest distance from said setting station, (h) and means operated in accompaniment with each operation of said back spacing member to unset that particular memory element which by the operated back spacing member is brought to the setting station.

7. In a typewriter having a carriage for advance and return travel, operable type keys, a typing mechanism selectively responsive to said type keys to type different charatcers, means normally tending to advance the carriage, and a proportional letter-feed mechanism normally holding the carriage against advancement and including means to respond to individual operations of said type keys to facilitate after each character is typed a proportional step advancement of the carriage in terms of varying multiples of a basic feed increment, the combination therewith of a device to backspace the carriage successively in terms of appropriate multiples of said basic feed increment to recall seriatim a series of passed typing positions of the carriage in an order reverse to that in which they occurred, comprising, (a) a rotatively mounted disk, (b) means interconnecting said disk with said carriage so that lineal movement of the carriage is always translated into rotary movement of the disk and vice versa, (c) a plurality of memory elements carried on said disk in a concentric array and spaced thereon in accord with single basic feed increments of the carriage transmittable thereto, (d) an operable setting member at a setting station and opposite which any of said memory elements may normally reside under the control of the proportional letter-feed mechanism in order to be settable by said setting member to memorize the carriage position, (e) means to actuate and restore said setting member incidental to each response of said typing mechanism to said type keys and before the proportional letter-feed mechanism facilitates a step advancement of the carriage, whereby each time a memory element is set at said setting station and then advances under the control of the proportional letter-feed mechanism, (f) a backspacing member having an operating stroke sufficient to backspace to said setting station any memory element which stands set at and has advanced from said setting station a distance not more than the largest proportional space, (g) a backspacing key, (h) means controllable by said backspacing key to effect an actuating stroke and a restoring stroke of said backspacing member, (i) guiding means to govern the path of operation of said backspacing member by the set memory elements which stand advanced beyond said setting station to cause said backspacing member to be effective during each of its actuating strokes only on the particular set memory element which happens to stand advanced the shortest distance from the setting station, said backspacing member gliding idly past set memory elements in its return stroke.

(j) a restoring element for restoring any set memory element which resides at said setting station, (k) and means responsive to said controllable means in the restoring stroke thereof to operate said restoring element.

8. In a typewriter having a carriage for advance and return travel, operable type keys, a typing mechanism selectively responsive to said type keys to type different characters, means normally tending to advance the carriage, and a proportional letter-feed mechanism normally holding the carriage against advancement and including means to respond to individual operations of said type keys to facilitate after each character is typed a proportional step advancement of the carriage in terms of varying multiples of a basic feed increment, the combination therewith of an improvement for backspacing said carriage comprising, (a) a memory member for storing a record representative of successive step movements of the carriage, (b) means associating said memory member with the carriage for movement of either one by the other, (c) a plurality of settable elements on said memory member so spaced that for each basic increment advance movement of the carriage the memory member will advance a related basic increment, (d) a setting member for said settable elements at a setting station opposite to which any of said settable elements may reside while the proportional letter-feed mechanism holds said carriage against advance, (e) means to actuate and restore said setting member incidental to each response of said typing mechanism to said keys and before the proportional letter-feed mechanism facilitates a step advancement of the carriage, (f) a backspacing key, (g) backspacing means responsive to one or more operations of said backspacing key to impart each time under the control of any set memory element which in a given range in backspacing direction happens to reside set and closest to the setting station, a single-sweep backspacing movement to such memory element which will position it at the setting station, thereby to recall the carriage position at which it was set, (h) a restoring element operable to restore any set memory element residing at said setting station, (i) means to operate said restoring element in accompaniment with each response of said backspacing means to said backspacing key but only after in each backspacing operation a set memory element has been brought to said setting station, (j) a cam at one end of said restoring element, (k) a carriage return key, (l) a normally ineffective carriage return drive, (m) a carriage return control mechanism conditionable by operation of said carriage return key to render said carriage return drive active to return the carriage to a predetermined position, (n) and means subject to control by said carriage return control mechanism to render said restoring element operated for the duration the carriage return drive is active, said cam edge being arranged at such end of the restoring element as to cam any set memory element to restored position which due to carriage travel in a returning sense travels the last increment toward said setting station.

9. In a typewriter having a carriage for advance and return travel, operable type keys, a typing mechanism selectively responsive to said type keys to type different characters, means normally tending to advance the carriage, and a proportional letter-feed mechanism normally holding the carriage against advancement and including means to respond to individual operations of said type keys to facilitate after each character is typed a proportional step advancement of the carriage in terms of varying multiples of a basic feed increment, the combination therewith of an improvement for backspacing said carriage comprising, (a) a memory member for storing a record representative of successive step movements of the carriage, (b) means associating said memory member with the carriage for movement of either one by the other, (c) a plurality of settable memory elements on said memory member so spaced that for each basic increment advance movement of the carriage the memory member will advance a related basic increment, (d) a setting member for said settable elements at a setting station opposite to which any of said settable memory elements may reside while the proportional letter-feed mechanism holds said carriage against advance, (e) means to actuate transitorily said setting member incidental to each response of said typing mechanism to said keys and before the proportional letter-feed mechanism facilitates a step advancement of the carriage, (f) a spacing key whereto said proportional letter-feed mechanism is responsive to facilitate a given incremental advance of the carriage, (g) means responsive to said spacing key at each operation thereof before the proportional spacing mechanism facilitates said given incremental advance of the carriage, to operate transistorily said setting member, whereby a record of proportional step advances as well as space advances is produced by the set memory elements, (h) a backspacing key, (i) back spacing means responsive repeatedly to separate operations of said backspacing key to effect each time under the control of any set memory element which in a given range in backspacing direction happens to reside set and closest to the setting station, a backspacing movement which will position such set memory element at the setting station, thereby to recall the carriage position at which it was set, (j) and means effective in accompaniment with each operation of said back spacing means to unset that particular memory element under the control of which in such operation it was brought to the setting station, whereby after each operation of the back spacing key the record of the proportional space positions and the word space positions obtained by the spacing key is correctly represented by the memory elements which remain set.

References Cited

UNITED STATES PATENTS

| | | | |
|---|---|---|---|
| 2,815,109 | 12/1957 | Demmel et al. | 197—84 |
| 3,346,086 | 10/1967 | Cralle et al. | 197—91 X |
| 928,591 | 7/1909 | Delvigne | 197—91 |
| 1,243,955 | 10/1917 | Krusius | 197—91 |
| 1,286,186 | 11/1918 | Miller | 197—84.3 |
| 2,439,470 | 4/1948 | Jackson | 197—84.3 X |
| 2,872,014 | 2/1959 | Khalil | 197—91 X |
| 2,945,578 | 7/1960 | Beccio | 197—84.3 |
| 2,986,258 | 5/1961 | Lambert | 197—88 |
| 3,018,870 | 1/1962 | Lambert et al. | 197—84.3 |
| 3,045,798 | 7/1962 | Lambert et al. | 197—84.3 |

ROBERT E. PULFREY, *Primary Examiner.*

E. T. WRIGHT, *Assistant Examiner.*

U.S. Cl. X.R.

197—84